United States Patent
Yonezawa

(10) Patent No.: US 10,917,648 B2
(45) Date of Patent: Feb. 9, 2021

(54) IMAGE PROCESSING APPARATUS, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventor: Keiko Yonezawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/255,111

(22) Filed: Jan. 23, 2019

(65) Prior Publication Data

US 2019/0238859 A1  Aug. 1, 2019

(30) Foreign Application Priority Data

Jan. 31, 2018 (JP) .................................. 2018-015508

(51) Int. Cl.
| | |
|---|---|
| *H04N 19/167* | (2014.01) |
| *H04N 19/33* | (2014.01) |
| *H04N 19/137* | (2014.01) |
| *H04N 19/162* | (2014.01) |

(52) U.S. Cl.
CPC ......... *H04N 19/167* (2014.11); *H04N 19/137* (2014.11); *H04N 19/162* (2014.11); *H04N 19/33* (2014.11)

(58) Field of Classification Search
None
See application file for complete search history.

(56) References Cited

U.S. PATENT DOCUMENTS

| | | | |
|---|---|---|---|
| 7,421,134 B2 | 9/2008 | Hashimoto | |
| 8,115,821 B2 | 2/2012 | Maki et al. | |
| 2004/0095477 A1 | 5/2004 | Maki et al. | |
| 2004/0179110 A1 | 9/2004 | Hashimoto | |
| 2009/0122164 A1 | 5/2009 | Maki et al. | |
| 2016/0203584 A1* | 7/2016 | Wu | G06T 7/11 382/195 |
| 2018/0232592 A1* | 8/2018 | Stewart | G08B 13/19684 |
| 2019/0075302 A1* | 3/2019 | Huang | H04N 19/52 |

FOREIGN PATENT DOCUMENTS

| | | |
|---|---|---|
| JP | H09-046710 A | 2/1997 |
| JP | 2004-072655 A | 3/2004 |
| JP | 2004-200739 A | 7/2004 |
| JP | 2006-014121 A | 1/2006 |
| JP | 2006-093784 A | 4/2006 |
| JP | 2007-088897 A | 4/2007 |

* cited by examiner

*Primary Examiner* — Christopher G Findley
(74) *Attorney, Agent, or Firm* — Venable LLP

(57) ABSTRACT

An image processing apparatus sets a region of interest for an image frame of a moving image captured by a capturing unit, based on an operation by a user, detects a moving object region in the image frame, determines whether at least part of the detected moving object region is contained in the region of interest or not, and, in a case where at least part of the detected moving object region is determined to be contained in the region of interest, performs encoding such that the entire region of interest becomes higher in image quality than an outside of the region of interest.

15 Claims, 8 Drawing Sheets

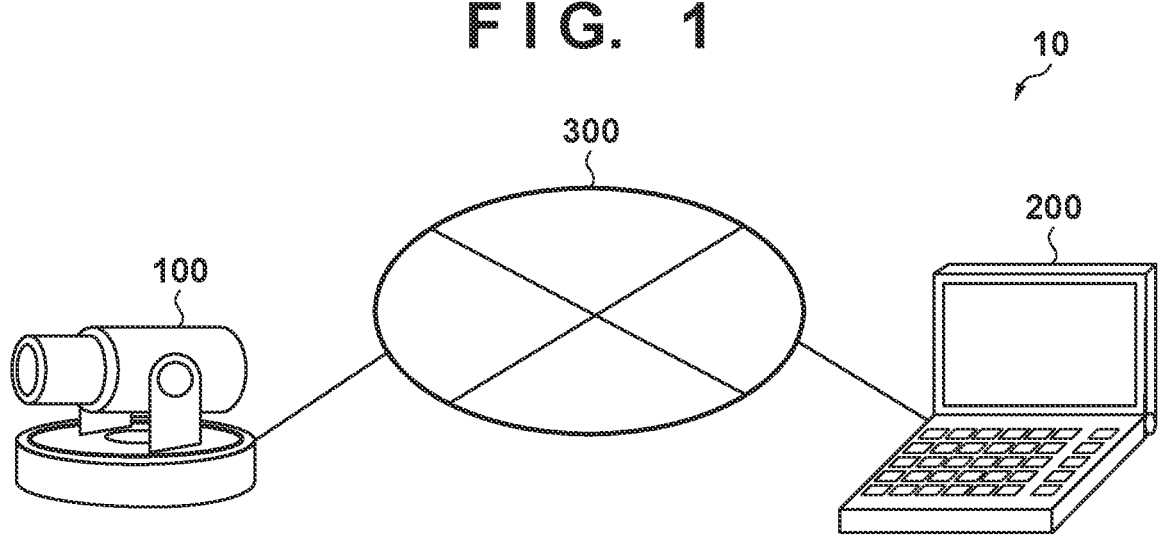

IMAGE PROCESSING APPARATUS, IMAGE PROCESSING METHOD, AND NON-TRANSITORY COMPUTER-READABLE STORAGE MEDIUM

BACKGROUND OF THE INVENTION

Field of the Invention

The present invention relates to an image processing apparatus, an image processing method, and a non-transitory computer-readable storage medium.

Description of the Related Art

In recent years, along with the popularization of smart phones, digital video cameras, or the like, opportunities for generating image data by image capturing increase. On the other hand, storage capacity for recording image data, or a communication bandwidth for transmitting/receiving image data is limited. Thus, technology for efficiently compressing image data (compressing and encoding technology) is demanded. As standards for the compressing and encoding technology, standards called as H.264/AVC are known. Additionally, standards called as H.265/HEVC also begin to spread.

In the compressing and encoding technology, in order to adjust image quality of image data, parameters such as a Quantization Parameter are used. Using these parameters enables, while preventing degradation of image quality, to reduce a data amount.

As a technique for image quality adjustment of image data by using the quantization parameters, a technique in which a Region of Interest (ROI) is set in an image, and the different quantization parameters are applied inside and outside the ROI has been known. As a technology for setting the ROI, Japanese Patent Laid-Open No. 2004-72655 discloses a method for selecting one technique from a plurality of ROI setting methods, according to user selection or a result of scene analysis, and setting an ROI by using the selected technique. Japanese Patent Laid-Open No. 2007-88897 discloses a method in which region extraction by combining moving object detection and head detection is performed, and a final ROI is set according to a size of the extracted region. Additionally, Japanese Patent Laid-Open No. 2006-93784 discloses a method in which an ROI is set for a region set by a user and a region in which a moving object is detected, when both of the regions overlap, by synthesizing a region including both of the regions.

However, a problem arises that processing for image quality enhancing is not performed effectively unless the ROI is set adequately. In the method in Japanese Patent Laid-Open No. 2004-72655, the user needs to select an ROI setting technique according to a scene, and as a result, the ROI is not set adequately in some cases. In addition, in the method in Japanese Patent Laid-Open No. 2007-88897, when the extracted region is large, a head region takes priority, and characteristics of clothes and the like are not set as ROIs in some cases. Further, in the method in Japanese Patent Laid-Open No. 2006-93784, the entire moving object region is also set as the ROI, and thus the ROI is possibly larger than necessary, when vegetation, a water surface, which are constantly moving, or the like exists.

SUMMARY OF THE INVENTION

According to one aspect of the present invention, there is provided an image processing apparatus which comprises: a region setting unit for setting a region of interest for an image frame of a moving image captured by a capturing unit, based on an operation by a user; a detection unit for detecting a moving object region in the image frame; a determination unit for determining whether at least part of the detected moving object region is contained in the region of interest or not; and an encoding unit, in a case where at least part of the detected moving object region is determined to be contained in the region of interest by the determination unit, performs encoding such that the entire region of interest becomes higher in image quality than an outside of the region of interest.

Further features of the present invention will become apparent from the following description of exemplary embodiments (with reference to the attached drawings).

BRIEF DESCRIPTION OF THE DRAWINGS

FIG. 1 is a schematic configuration of an image processing system 10.

DESCRIPTION OF THE EMBODIMENTS

Hereinafter, embodiments of the present invention will be described in detail with reference to the accompanying drawings. Note that, configurations illustrated in the following embodiments are merely examples, and the present invention is not limited to the configurations described in the following embodiments. Additionally, each embodiment will be described taking image capturing for the purpose of monitoring as an example, but each embodiment is applicable to image capturing technology for various purposes such as broadcasting.

First Embodiment

As a first embodiment, a procedure will be described in which an important region in image data is set as a Region of Interest (ROI), and encoding is performed such that image quality is high inside the ROI and image quality is low outside the ROI. Specifically, moving object detection is performed for an ROI set by a user (a user-defined ROI), and an inside of the ROI is subjected to image quality enhancing only when a moving object is detected inside the ROI. Performing the above processing suppresses increase in bit rate due to constantly enhancing image quality inside the ROI, enhances image quality only when the image quality enhancing is necessary, and thus enables efficient information compression.

[Schematic Configuration of Image Processing System 10]

FIG. 1 illustrates a schematic configuration of the image processing system 10 in the embodiment. The image processing system 10 is configured with the image processing apparatus 100 configured to function as an image capturing device, and a client device 200, and the image processing apparatus 100 and the client device 200 are connected in a state of being capable of mutually communicating via a network 300. In the present embodiment, the image processing apparatus 100 is assumed to be a device (e.g., a network camera) connected with a network and capable of communicating with other devices, but being capable of connecting with the network is not essential.

The client device 200, based on an operation by a user, transmits a delivery request command for requesting delivery of a video (image) stream, and a setting command for setting various parameters or information on an ROI, to the image processing apparatus 100. The image processing apparatus 100, according to the delivery request command, delivers the video stream to the client device 200, and according to the setting command, stores the various parameters. A configuration of the image processing apparatus 100 will be described later. It is possible to implement the client device 200 by installing a predetermined program in a computer such as a personal computer, a tablet terminal, or a smart phone.

Configuration of Image Processing Apparatus 100 in First Embodiment

Figure 2A:
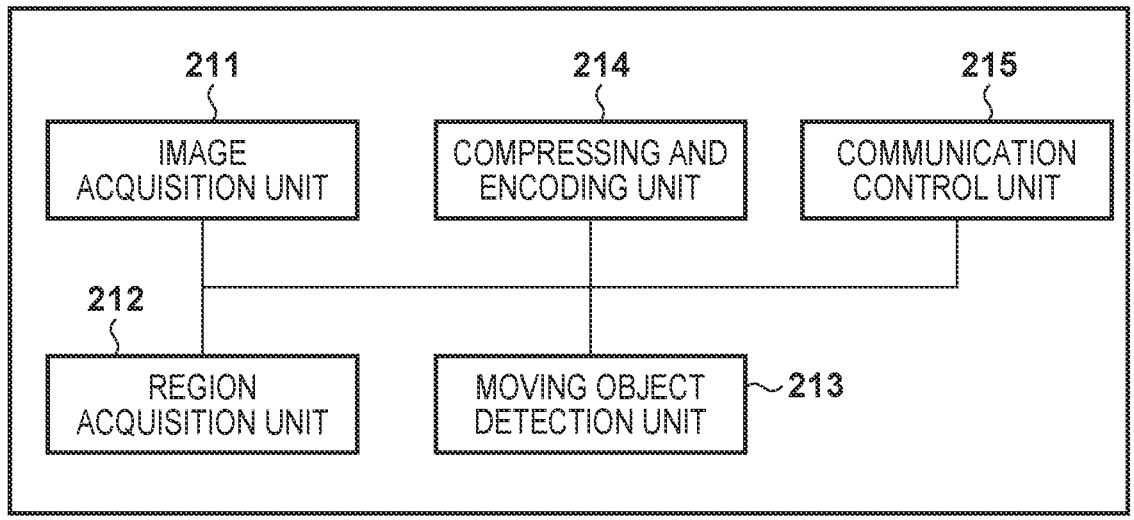
FIG. 2A illustrates an example of a functional configuration of an image processing apparatus 100 in a first embodiment.
Figure 2B:
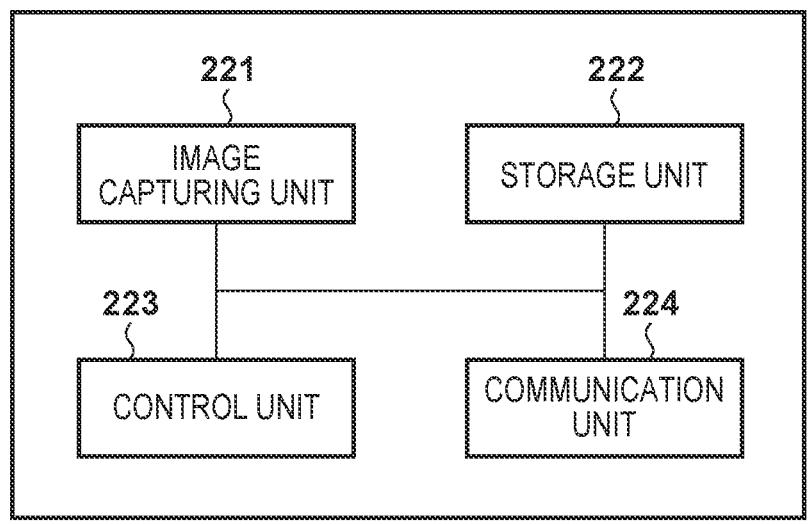
FIG. 2B illustrates an example of a hardware configuration of the image processing apparatus 100.

Next, the configuration of the image processing apparatus 100 will be described with reference to FIG. 2A and FIG. 2B. FIG. 2A illustrates an example of a functional configuration of the image processing apparatus 100. In FIG. 2A, the image processing apparatus 100, as a functional configuration, is configured with and includes an image acquisition unit 211, a region acquisition unit 212, a moving object detection unit 213, a compressing and encoding unit 214, and a communication control unit 215.

The image acquisition unit 211 acquires a moving image from an image capturing unit 221 (FIG. 2B) or an external device (not illustrated), and generates each frame (image frame) of image data. The image acquisition unit 211, by utilizing various parameters (various settings) acquired from a storage unit 222 (FIG. 2B), is capable of generating each frame of image data.

The region acquisition unit 212 acquires information on a user-defined ROI in the client device 200. The region acquisition unit 212 stores the acquired information on the ROI in the storage unit 222 (FIG. 2B), and outputs (sets) the acquired information on the ROI to the moving object detection unit 213 and the compressing and encoding unit 214. The moving object detection unit 213 and the compressing and encoding unit 214 operate based on this information on the ROI. That is, the region acquisition unit 212 functions as a region setting unit.

The moving object detection unit 213 performs a process for detecting a moving object region (moving object detection process), for each frame of the image data generated by the image acquisition unit 211. As methods for the moving object detection process (moving object detection method), for example, an inter-frame difference method detecting a moving region from a difference between frames, and a background difference method in which a background image is generated and a moving region is detected as a foreground with respect to the background from the difference, are known. These moving object detecting methods are detecting methods based on a difference value between a pixel value of a frame of a detection target and a pixel value of another image (e.g., a background image). The moving object detection process by the moving object detection unit 213 will be described later.

The compressing and encoding unit 214, based on the various parameters acquired from the storage unit 222 (FIG. 2B), the information on the ROI acquired from the region acquisition unit 212, and a detection result by the moving object detection unit 213, performs compressing and encoding. The compressing and encoding process by the compressing and encoding unit 214 will be described later.

The communication control unit 215 transmits the image data encoded by the compressing and encoding unit 214, for example, in a stream format, via a communication unit 224 (FIG. 2B), through a network 300, to the client device 200.

Next, a hardware configuration example of the image processing apparatus 100 will be described. The FIG. 2B illustrates an example of a hardware configuration of the image processing apparatus 100. In FIG. 2B, the image processing apparatus 100, as a hardware configuration, is configured with and includes the image capturing unit 221, the storage unit 222, a control unit 223, and the communication unit 224.

The image capturing unit 221 receives light formed through a lens at an image capturing element, converts the received light to an electrical charge, and acquires a moving image. As the image capturing element, for example, a Complementary Metal Oxide Semiconductor (CMOS) image sensor is usable. Additionally, as the image capturing element, a Charge Coupled Device (CCD) image sensor may be used.

The storage unit 222 is configured with both or one of a Read Only Memory (ROM) and a Random Access Memory (RAM), and stores a program for executing various operations described later. Additionally, the storage unit 222 is capable of storing data (a command or image data) and various parameters acquired from an external device such as the client device 200 via the communication unit 224. For example, the storage unit 222 stores camera parameters being settings such as white balance and exposure for the moving image acquired by the image capturing unit 221, encoding parameters for the compressing and encoding, and the like. The encoding parameters include time for enhancing image quality of the ROI (duration for image-quality enhancing process) and quantization parameter values for each of an inside and an outside of the ROI (hereinafter, a qP value). Note that, as the qP value increases, a quantization step increases, and thus image quality degrades when compressing is performed with a larger qP value. Additionally, the storage unit 222 is also capable of storing parameters for image data including a frame rate of the image data and a size of the image data (resolution).

In addition, the storage unit 222 is capable of providing a work area which the control unit 223 uses when performing various processes. Further, the storage unit 222 is also capable of functioning as a frame memory or a buffer memory. Note that, as the storage unit 222, besides the memories such as the ROM and the RAM, a storage medium such as a flexible disk, a hard disk, an optical disk, a magnetic optical disk, a CD-ROM, a CD-R, a magnetic tape, a non-volatile memory card, a DVD, or the like may be used.

The control unit 223 is configured with a Central Processing Unit (CPU) or a Micro Processing Unit (MPU), and executes a program stored in the storage unit 222 to control the entire image processing apparatus 100. Note that, the control unit 223 may control the entire image processing apparatus 100 in cooperation with programs and an Operating System (OS) stored in the storage unit 222. Note that, the control unit 223 may be configured with a processor such as a Digital Signal Processor (DSP), or an Application Specific Integrated Circuit (ASIC).

The communication unit 224 transmits/receives a wired signal or a wireless signal in order to communicate with the client device 200 via the network 300. Note that, the functional configuration of the image processing apparatus 100 illustrated in FIG. 2A may be implemented with the hardware illustrated in FIG. 2B, or may be implemented with software.

[Descriptions about Static ROI and Dynamic ROI]

Figure 3:
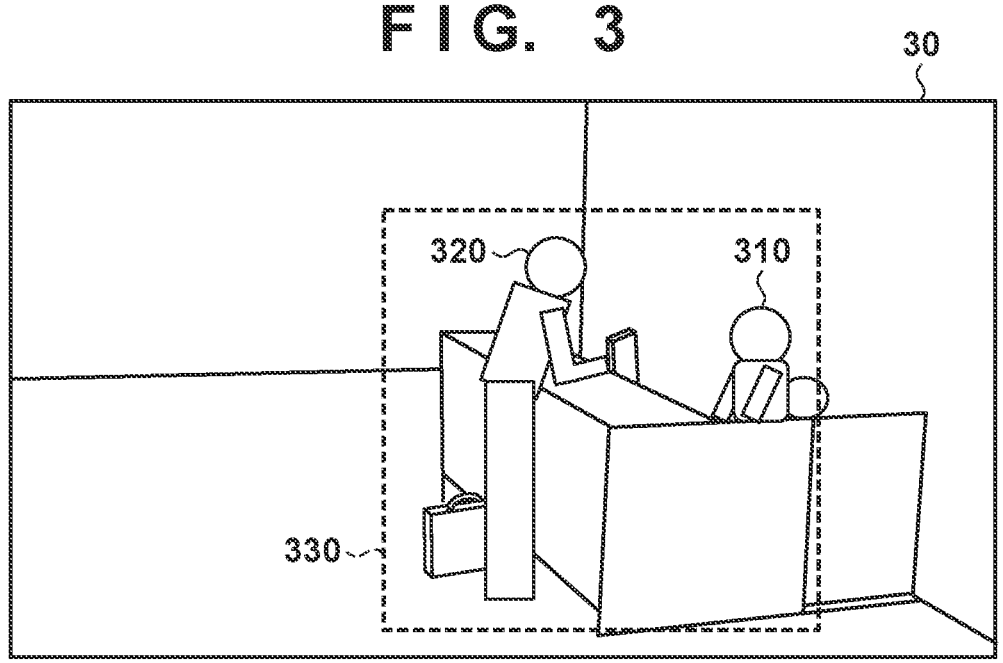
FIG. 3 is a schematic diagram of a static ROI.

Next, in association with the processing by the compressing and encoding unit 214 in the present embodiment, a static ROI and a Dynamic ROI will be described with reference to FIG. 3 to FIG. 4. FIG. 3 is a schematic diagram of the static ROI. FIG. 3 illustrates an image frame 30 generated by capturing a scene at a reception counter in an office. In the image frame 30, a receptionist 310 at the reception counter, and a visitor 320 carrying out a necessary procedure at the reception counter appear.

In this circumstance, a user sets an ROI 330 for the image frame 30. In the scene illustrated in FIG. 3, a location of the visitor 320 is substantially identical location for different visitors, and thus the user sets the ROI 330 with a location thereof fixed around the reception counter. The "static ROI" refers to this ROI 330 with the location fixed. When a compressing and encoding technique for enhancing image quality of only an inside of the static ROI is used, in the example in FIG. 3, irrelevant of existence or absence of the visitor 320, the image quality enhancing for the inside of the ROI 330 is possibly performed constantly.

Figure 4:
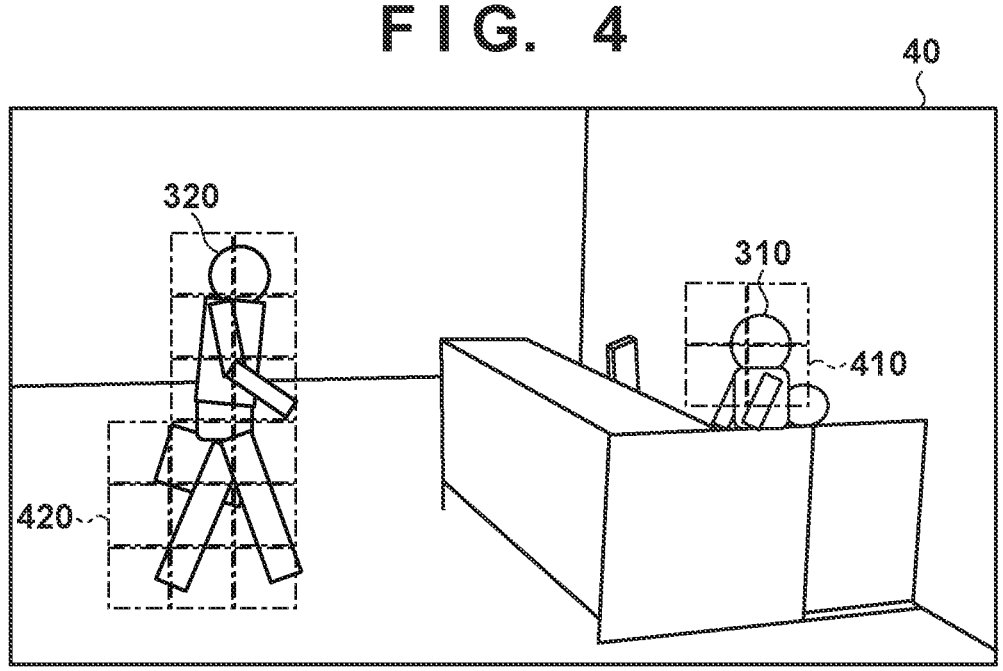
FIG. 4 is a schematic diagram of a dynamic ROI.

FIG. 4 is a schematic diagram of the dynamic ROI. Similarly to FIG. 3, FIG. 4 illustrates an image frame 40 generated by capturing a scene at the reception counter in the office. The "dynamic ROI" is an ROI set according to a location on which a moving object in an image is detected, or the like. In an example in FIG. 4, a region 410 in which movement is detected around the receptionist 310, and a region 420 in which movement is detected around the visitor 320 visiting the reception counter are dynamically set as ROIs. Setting the dynamic ROIs in this way makes it possible to dynamically change a location of a region in an image for which image quality is to be enhanced in accordance with the situation.

The compressing and encoding is capable of quantizing and encoding regions in an image by using respective different quantization parameters. As described above, compression with a larger qP value (quantization parameter value) further degrades image quality. Thus, a smaller ROI to be subjected to the image quality enhancing raises compression efficiency. Accordingly, an ROI is desirably as small as possible for a region other than a target (object) for the image quality enhancing. In the case of the static ROI (ROI 330) illustrated in FIG. 3, irrelevant of presence or absence of the visitor 320, a set region of the ROI 330 is constantly subjected to the image quality enhancing (a low qP value), and thus the compression efficiency deteriorates. That is, unnecessary image quality enhancing is possibly performed in a time direction.

Compared to this, in the region 410 and the region 420 corresponding to the respective dynamic ROIs in FIG. 4, only when the visitor 320 moves, only a location corresponding to the movement is subjected to the image quality enhancing, and thus unnecessary image quality enhancing is reduced. However, when the visitor 320 moves less, the movement is not detected precisely, and the visitor 320 and a periphery thereof are not set as ROIs, and are not subjected to the image quality enhancing in some cases. Further, when a constantly moving object in image data (e.g., an escalator, or a plant and a water surface that are wavering in wind) exists, a region containing such an object is constantly set as an ROI, and is unnecessarily subjected to the image quality enhancing in some cases. Additionally, when the image processing apparatus 100 is installed for the purpose of monitoring, compared to a normal video camera, the acquired moving image often moves less, or targets (objects) to be observed are often limited.

In view of the above circumstances, the image processing apparatus 100 in the present embodiment performs the following processing.

Processing Flow of Image Processing Apparatus 100 in First Embodiment

Figure 5:
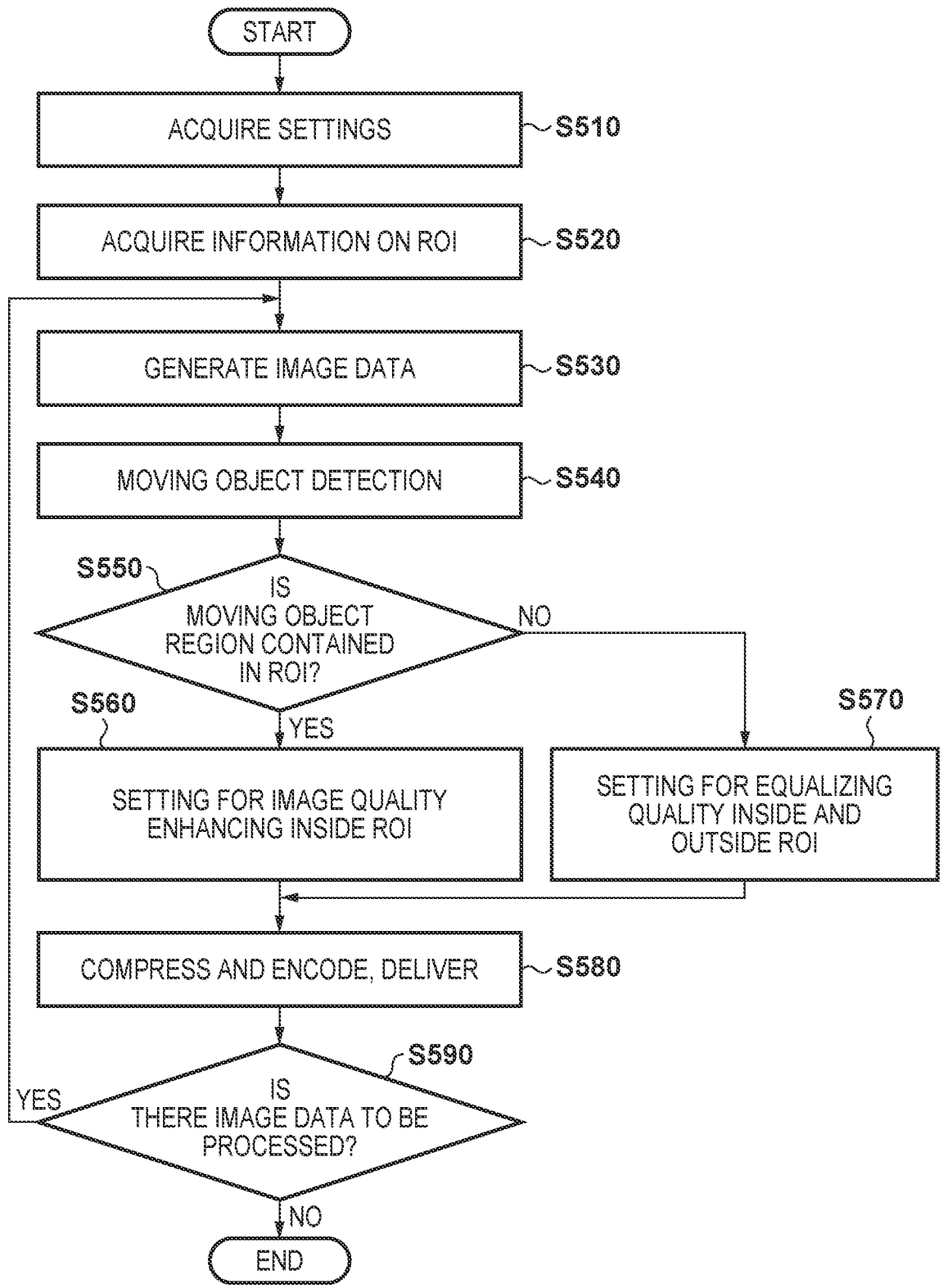
FIG. 5 is a flowchart of processing of the image processing apparatus 100 in the first embodiment.

By using FIG. 5, processing of the image processing apparatus 100 in the first embodiment will be described. FIG. 5 is a flowchart of processing of the image processing apparatus 100 in the first embodiment. The flowchart illustrated in FIG. 5 may be achieved by the control unit 223 of the image processing apparatus 100 that executes a control program stored in the storage unit 222, performs operations and processes of information, and controls each of pieces of hardware.

In S510, the image acquisition unit 211 acquires settings necessary for generating image data. For example, the image acquisition unit 211 acquires parameters for image data and camera parameters from the storage unit 222. The parameters for the image data include a frame rate of the image data and a size of the image data (resolution), and the camera parameters include settings such as white balance and exposure. In the present embodiment, as an example, a size of image data is defined by 3840×2160 pixels, and a frame rate is 30 fps. Additionally, in S510, the compressing and encoding unit 214 acquires encoding parameters for the compressing and encoding from the storage unit 222. The encoding parameters in the present embodiment include a qP value (quantization parameter value) for the encoding compliant with H.264. In the present embodiment, as an example, a qP value inside an ROI is 35, and a qP value outside the ROI is 43.

In S520, the region acquisition unit 212 acquires information on a user-defined ROI in the client device 200. The region acquisition unit 212 stores the acquired information on the ROI in the storage unit 222 and sets the acquired information to the moving object detection unit 213 and the compressing and encoding unit 214. The information on the ROI, for example, may be coordinates based on a pixel location with an upper left of a region of a frame being an origin, or may be a number for identifying the ROI as far as a location of the ROI is identified in advance. Additionally, the ROI may be indicated by macro blocks. Further, when the ROI has a polygonal shape such as a rectangle illustrated in FIG. 3, coordinates of each vertex and the like also suffice, and in a case of a circular shape, coordinates of a center, a radius, and the like also suffice.

In S530, the image acquisition unit 211 generates each frame of the image data, according to the various settings acquired in S510. The image acquisition unit 211 outputs the generated image data to the moving object detection unit 213 and the compressing and encoding unit 214.

In S540, the moving object detection unit 213 performs a moving object detection process for each frame of the image data generated in S530. The moving object detection unit 213 may perform the moving object detection process for all the frames of the image data, or perform the moving object detection process at an interval of some frames. Additionally, the moving object detection unit 213 may perform the moving object detection process for an entire frame, or perform the moving object detection process for the ROI set by the region acquisition unit 212. As the moving object detection methods, as described above, the inter-frame difference method and the background difference method are known. Hereinafter, moving object detection processes when the respective above methods are used will be described.

(1) A Moving Object Detection Process when the Inter-frame Difference Method is Used When the inter-frame difference method is used, the moving object detection unit 213 calculates a difference value between a pixel value of a frame being a target of moving-object detection (e.g., a current frame) and a pixel value of a frame (e.g., a previous frame (reference frame)) captured at different timing from the target frame. The moving object detection unit 213 detects a partial region with the difference value equal to or larger than a predetermined threshold as a moving object region. Note that, the pixel value is a mere example, and another feature amount of a frame may be used.

(2) A Moving Object Detection Process when the Background Difference Method is Used When the background difference method is used, first, the moving object detection unit 213 sets a frame captured when no moving object is assumed to exist (reference frame) as a background image. Then the moving object detection unit 213 calculates a difference value between a pixel value of the background image and a pixel value of a frame being a target of the moving-object detection (e.g., current frame). Note that, the pixel value is a mere example, and another feature amount of a frame may be used. The moving object detection unit 213 detects a region with the difference value equal to or larger than a predetermined threshold as a moving object region. Note that, the moving object detection unit 213, based on a location of a pixel equal to or larger than a predetermined threshold, may detect a pixel with the difference value smaller than the threshold as a moving object region. For example, when circumference of a pixel with the difference value smaller than the threshold is surrounded by pixels with the difference values equal to or larger than the threshold, the moving object detection unit 213 may also detect the pixel with the difference value smaller than the threshold as a moving object region.

Additionally, when the background difference method is used, processing may be done as follows. That is, the moving object detection unit 213 may divide a frame into a plurality of regions (blocks), extract a feature amount for each region, and compare the feature amount with a feature amount in a background image, to determine whether the region is the background or a foreground (moving object region). A size of one region is, for example, defined as 16×16 pixels being a unit of a macro block of H.264, but may be changed depending on a size of image data or the like. Additionally, as the feature amount, a conversion coefficient on a lower frequency side or the like may be used, when a pixel luminance value in a region is subjected to Discrete Cosine Transform (DCT). Additionally, as the feature amount, color information or the like may be used.

Additionally, as a feature amount of the background image, an average value of feature amounts of a plurality of frames or the like may be used. Note that, the feature amount of the background image may be prepared for each region. This feature amount for each region may be gradually updated as an image varies temporally. As an update method, a method may be used in which a background image less frequently referenced as the background image is replaced with a new background image. Additionally, an update method may be used in which a feature amount of a region of a current frame is reflected when the background image is referenced. The former update method is capable of handling a case in which the background itself has changed, and the latter update method is capable of handling a case in which the background gradually changes due to sunshine change or the like.

The moving object detection unit 213, for each region, compares an extracted feature amount with one or more feature amounts of the background, to determine whether the region is the background (non-moving object region) or the foreground (moving object region). Additionally, the moving object detection unit 213 performs post processing such as isolated point removal (processing in which a background surrounded by pixels determined to be a foreground is set as the foreground), and determines a final moving object region.

The moving object detection unit 213, when detecting a moving object region by using the inter-frame difference method or the background difference method, outputs information indicating a location of the detected moving object region to the compressing and encoding unit 214. The information indicating the location of the moving object region, for example, may be coordinates based on a pixel location with an upper left of a frame being an origin, or a number for identifying the moving object region as far as a location of the moving object region is identified in advance.

The description will return to FIG. 5. In S550, the compressing and encoding unit 214 compares the user-defined ROI acquired in S520 with the moving object region detected in S540, and determines whether at least part of the moving object region is contained in the ROI or not. However, when the moving-object detection in S540 is performed only for the ROI acquired in S520, the compressing and encoding unit 214 may determine whether the moving object region is detected in S540. When at least the part of the moving object region is contained in the ROI (S550: Yes), the processing advances to S560, and when the moving object region is not contained in the ROI (S550: No), the processing advances to S570.

In S560, the compressing and encoding unit 214 performs setting for encoding for image quality enhancing for an inside of the ROI. Specifically, the compressing and encoding unit 214 acquires and sets qP values inside the ROI and outside the ROI from the storage unit 222. As an example, the compressing and encoding unit 214 acquires 35 as the qP value inside the ROI and sets 43 as the qP value outside the ROI. In S560, the compressing and encoding unit 214 may further acquire and set time for enhancing image quality of the ROI (duration for the image-quality enhancing process) from the storage unit 222.

Here, a meaning of the duration for the image-quality enhancing process will be described. As described using FIG. 3 to FIG. 4, there is a situation with small movement, for example, when the visitor 320 proceeds a reception procedure at the reception counter, only his/her hands move, but while the visitor 320 being a target of the image quality enhancing exists, the image quality enhancing inside the ROI preferably continues. Further, when image quality inside the ROI switches between high and low in a short interval, visibility of an image may lower. Accordingly, in the present embodiment, once at least part of a moving object region is determined to be contained inside an ROI and is subjected to image quality enhancing, and subsequently, even when the moving object is no longer detected, the image quality enhancing continues in the duration for the image-quality enhancing process. In other words, when the moving object is no longer detected by the moving object detection unit 213 after at least the part of the moving object is determined to be contained in the ROI, or even when the moving object region is determined not to be contained in the ROI by the compressing and encoding unit 214, the image-quality enhancing process is performed. The duration for the image-quality enhancing process may be different depending on a scene, or may be set by a user. Alternately, the control unit 223 of the image processing apparatus 100 may manage a history of past moving-object detection, and set duration for the image-quality enhancing process for each event.

In S570, the compressing and encoding unit 214, since a moving object is not contained in the user-defined ROI, does not perform the image-quality enhancing process for an inside of the ROI, and performs setting for encoding to equalize image quality inside and outside the ROI. As an example, the compressing and encoding unit 214 sets 43 as a common qP value inside and outside the ROI.

In S580, the compressing and encoding unit 214, according to the compressing and encoding method or the parameter (qP value) set in S560 and S570, compresses and encodes a current frame. The image data subjected to the compressing and encoding is delivered (transmitted) to the client device 200 by the communication unit 224. Note that, the compressing and encoding unit 214 may record, without transmitting, the compressed and encoded image data, in the storage unit 222.

In S590, the control unit 223 determines whether there is image data to be subjected to the compressing and encoding or not. When there is image data to be subjected to the compressing and encoding (S590: Yes), the processing returns to S530, and is continued to the next image data. When there is no image data to be subjected to the compressing and encoding (S590: No), the processing ends.

Figure 6A:
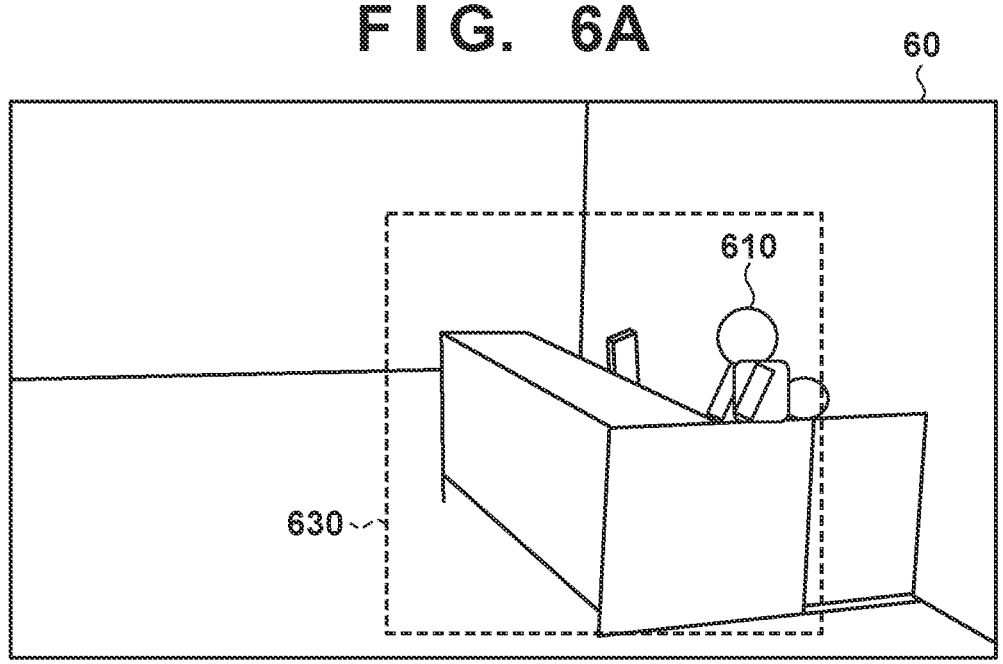
FIG. 6A to FIG. 6B are diagrams for describing processing by a compressing and encoding unit 214.
Figure 6B:
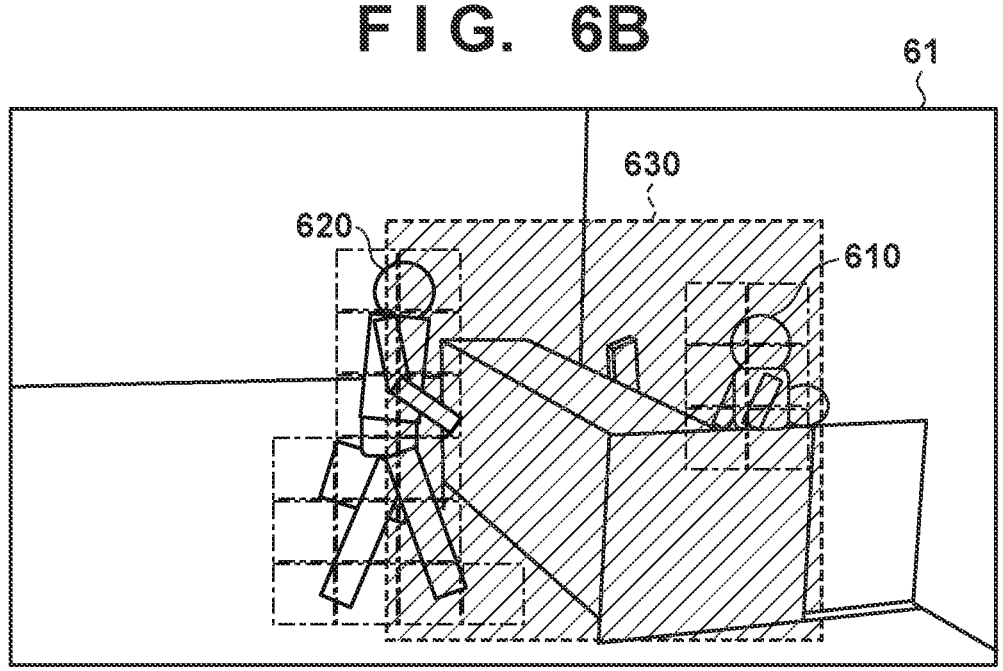

Next, with reference to FIG. 6A and FIG. 6B, the processing of S550 to S570 in FIG. 5 will be visually described. FIG. 6A to FIG. 6B are diagrams for describing processing by the compressing and encoding unit 214 of the image processing apparatus 100. Note that, each of FIG. 6A and FIG. 6B illustrates, similarly to FIG. 3 and FIG. 4, an image frame 60 and an image frame 61 generated by capturing a scene at the reception counter in the office.

FIG. 6A is a diagram corresponding to a case, in S550 in FIG. 5, in which no moving object region is determined to be contained in the ROI (S550: No). For example, FIG. 6A corresponds to a scene in which in a user-defined ROI 630, a receptionist 610 moves less, and there is no visitor. In this case, the compressing and encoding unit 214 does not perform the image quality enhancing even for an inside of the ROI 630. That is, the compressing and encoding unit 214 performs setting for encoding to equalize image quality inside and outside the ROI 630 (S570), and performs the compressing and encoding according to the setting (S580).

FIG. 6B is a diagram corresponding to a case, in S550 in FIG. 5, in which the moving object region is determined to be contained in the ROI (S550: Yes). For example, FIG. 6B corresponds to a scene in which in the user-defined ROI 630, a visitor 620 moves toward the reception counter, and the receptionist 610 greets the visitor 620. In this case, the compressing and encoding unit 214 performs the image quality enhancing for the inside of the ROI. That is, the compressing and encoding unit 214 performs setting for the inside of the ROI 630 to be subjected to the image quality enhancing (S560), and performs the compressing and encoding according to the setting (S580). Additionally, the compressing and encoding unit 214, when duration for the image-quality enhancing process is set, enhances image quality of the inside of the ROI 630 for the duration. Accordingly, for example, even in a case the visitor 620 moves less while writing in a paper, the image quality enhancing for the inside of the ROI 630 continues. This makes it possible to enhance image quality of the ROI 630 that is set to contain all interactions at the reception counter by the visitor 620.

As described above, the image processing apparatus 100 in the first embodiment enhances image quality of the inside of the ROI when the user-defined ROI contains at least the part of the moving object region, but, when the user-defined ROI does not contain the moving object region, the image processing apparatus 100 does not perform the image quality enhancing regardless of inside and outside the ROI and performs the compressing and encoding. Performing the above processing makes it possible to reduce a bit rate, because no image quality enhancing is performed when no event with movement occurs even inside the ROI. Further, when the ROI contains at least the part of the moving object region, by enhancing image quality of an entire required region (that is, the ROI), it is possible to prevent a region to be subjected to the image quality enhancing from varying depending on precision of the moving-object detection, and as a result, prevent failure of information reception.

Second Embodiment

Next, a second embodiment will be described. Note that, as for a similar component to that in the first embodiment, a description thereof will be omitted. In the first embodiment, the method in which, for the user-defined ROI, the inside of the ROI is subjected to the image quality enhancing only when the moving object is detected inside the ROI was described. In FIG. 6A to FIG. 6B described in the first embodiment, since the receptionist 610 constantly exists, even when there is no visitor and small movement by the receptionist 610 is detected, the ROI 630 is possibly subjected to the image quality enhancing. Accordingly, in the present embodiment, a procedure will be described in which, based on distribution of moving object regions of a scene when no target exists, a threshold (sensitivity) for moving-object detection, or duration in which the image quality enhancing is performed for the inside of the ROI is controlled.

Configuration of Image Processing Apparatus 100 in Second Embodiment

Figure 7:
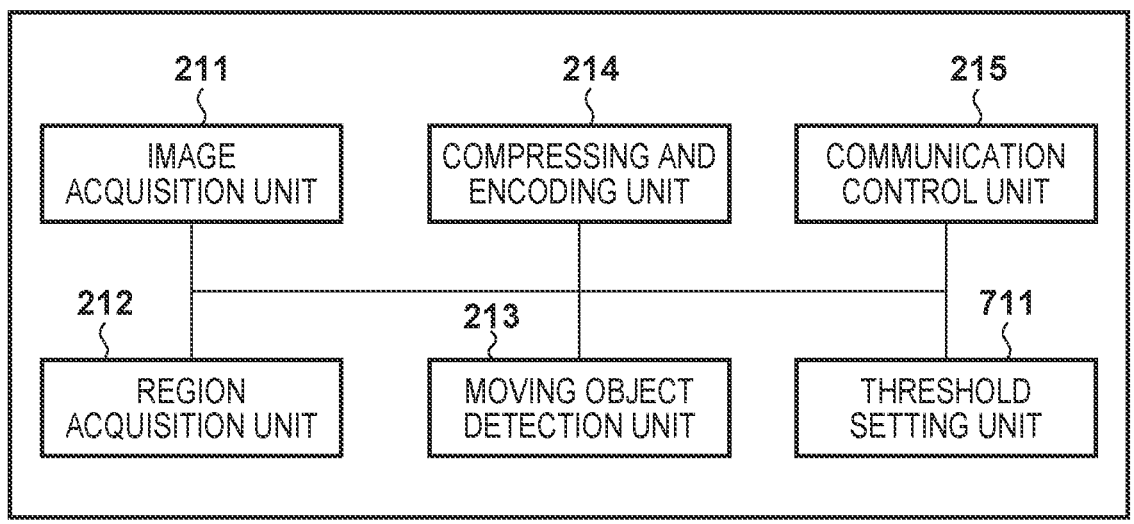
FIG. 7 illustrates an example of a functional configuration of the image processing apparatus 100 in a second embodiment.

FIG. 7 illustrates an example of a functional configuration of the image processing apparatus 100 in the present embodiment. The functional configuration illustrated in FIG. 7, except for a threshold setting unit 711, is similar to that in FIG. 2A described in the first embodiment, and a description thereof will be omitted. Additionally, a hardware configuration of the image processing apparatus 100 in the present embodiment is similar to that in FIG. 2B described in the first embodiment, and thus a description thereof will be omitted.

The threshold setting unit 711 sets a detection threshold as a first threshold (moving-object detection sensitivity), and a determination threshold as a second threshold. The detection threshold is a threshold for the moving object detection unit 213 to detect a moving object, and is a threshold to be compared with the difference value calculated by the technique described in the first embodiment. The determination threshold is a threshold for the compressing and encoding unit 214 to determine whether at least part of a detected moving object is contained in an ROI or not.

Operation Flow of Image Processing Apparatus 100 in Second Embodiment

Figure 8:
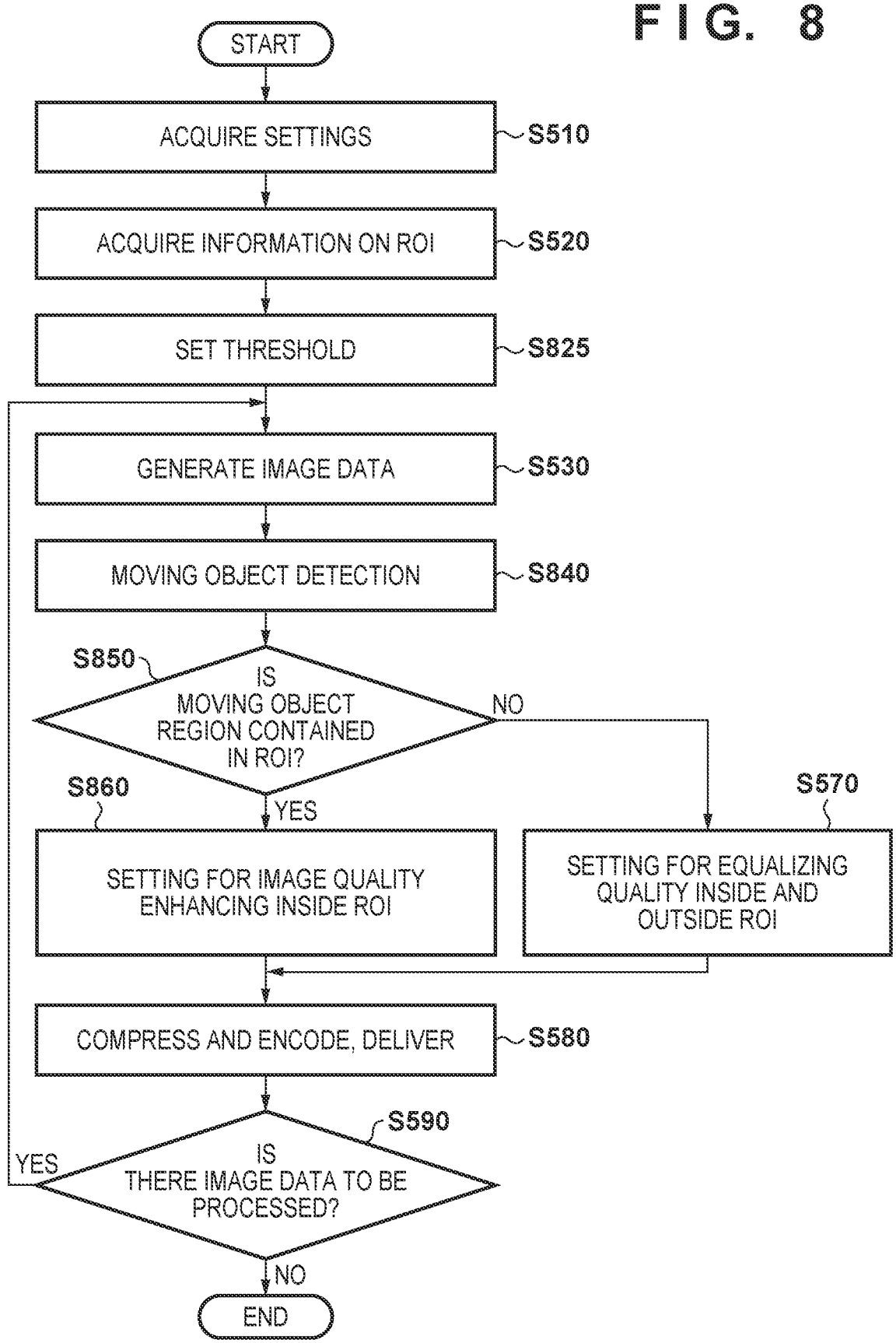
FIG. 8 is a flowchart of processing of the image processing apparatus 100 in the second embodiment.

Operations of the image processing apparatus 100 in the second embodiment will be described using FIG. 8. FIG. 8 is a flowchart illustrating operations of the image processing apparatus 100 in the second embodiment. The flowchart illustrated in FIG. 8 may be achieved by the control unit 223 of the image processing apparatus 100 that executes a control program stored in the storage unit 222, performs operations and processes of information, and controls each piece of hardware. Note that, since processes except for S825, S840, S850, and S860 are similar to the processes in FIG. 5 described in the first embodiment, descriptions thereof will be omitted.

Figure 9:
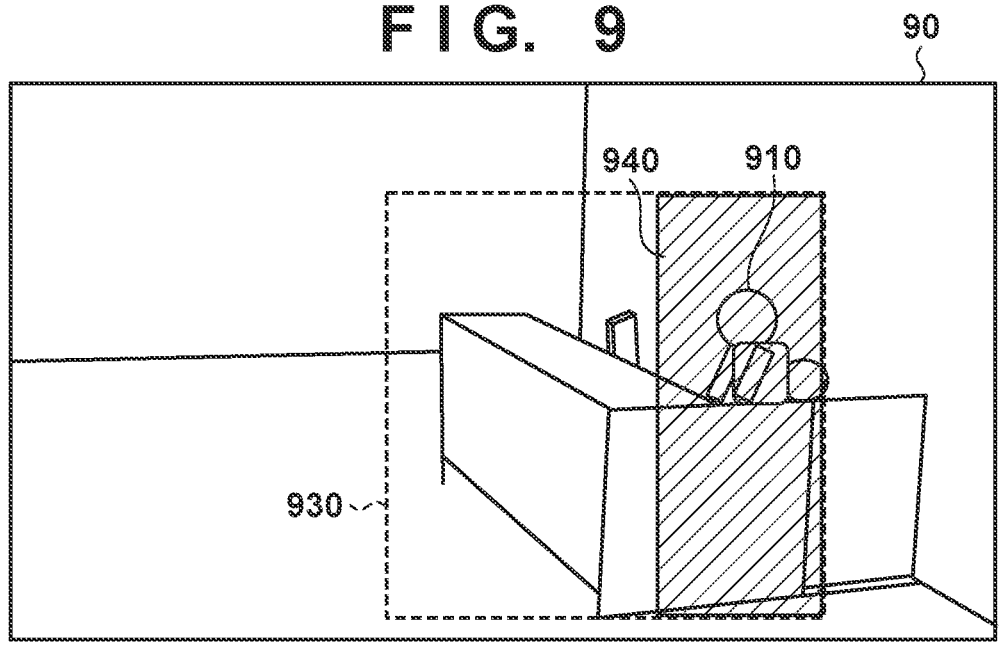
FIG. 9 is a diagram for describing a detection threshold set by a user.

After the region acquisition unit 212 acquires the information on the user-defined ROI in S520, the threshold setting unit 711 sets a detection threshold and a determination threshold in S825. In the simplest way, it is possible to acquire and set these thresholds according to user-defined settings. FIG. 9 is a diagram for describing a detection threshold set by a user. FIG. 9, similarly to FIG. 3 and FIG. 4, illustrates an image frame 90 generated by capturing a scene at the reception counter in the office. The user is able to set a high detection threshold for a region 940 containing a receptionist 910 assumed to move to a certain extent with respect to an ROI 930. According to the user-defined setting, the threshold setting unit 711 sets different detection thresholds for the region 940 and for other than the region 940. The method for setting the detection threshold according to the user-defined setting is effective for a case in which a constantly moving region is obviously contained in the ROI. The constantly moving region is, for example, a region containing vegetation put outside a window of a building, a region containing an escalator, a fountain, a water tank, or the like, a region in which a television monitor is installed, and the like. Note that, in the example in FIG. 9, the region 940 for which the high detection threshold is set exists inside the ROI, but the region may be set not only inside the ROI, but also in a frame.

Additionally, when a size of a target to be subjected to the image quality enhancing is known in advance, the threshold setting unit 711 is capable of setting an area to be occupied by the target as a determination threshold. That is, only when a size of the moving object region detected in the ROI is larger than the threshold, the moving object is determined to be detected in the ROI. This setting enables to reduce a possibility that the ROI is unnecessarily subjected to the image quality enhancing when a small animal passes a background, or the like.

Figure 10:
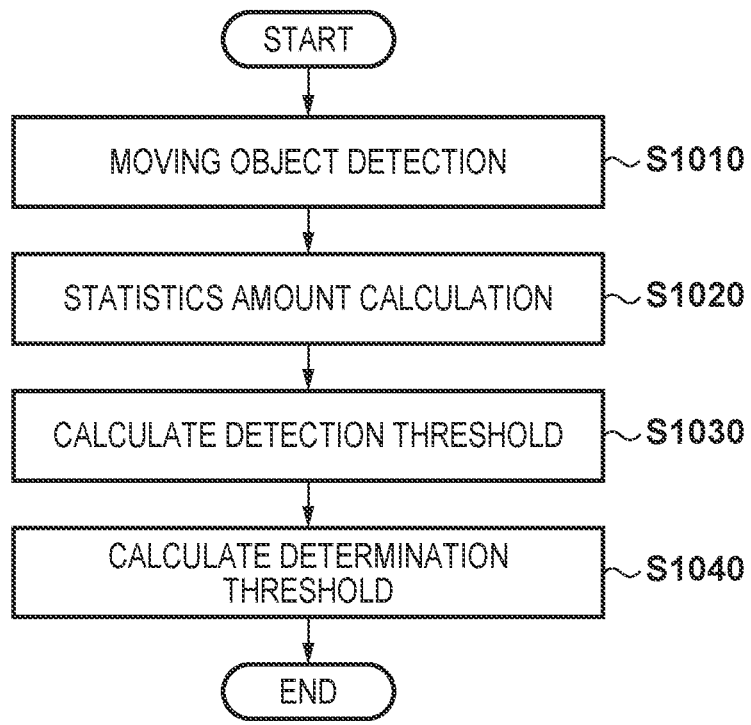
FIG. 10 is a flowchart of processing for setting a detection threshold and a determination threshold.

Next, a method for setting a detection threshold and a determination threshold according to analysis of image data by the moving object detection unit 213 will be described with reference to FIG. 10. FIG. 10 is a flowchart of processing for setting a detection threshold and a determination threshold by the moving object detection unit 213. As an assumption, the moving object detection unit 213 analyzes one or more frames (reference frames) captured when no moving object is assumed to exist. For example, the moving object detection unit 213, in the scenes at the reception counter illustrated in FIGS. 3, 4, 6, 9, and the like, analyzes one or more frames of image data in a state without a visitor.

In S1010, the moving object detection unit 213 performs the moving object detection process for each frame of the image data generated in S530. As described in the first embodiment, when the inter-frame difference method is used, the moving object detection unit 213 calculates a difference of pixel values for each predetermined region (a pixel or a small area) between a current frame and a previous frame. Additionally, when the background difference method is used, the moving object detection unit 213 calculates a difference of pixel values for each predetermined region (a pixel or a small area) between a background image and a current frame. Note that, the difference value may be a difference value of a feature amount other than the pixel value.

In S1020, the threshold setting unit 711 accumulates the difference values of the pixel values in each of the regions calculated in S1010, and calculates statistics amounts such as a mean, a variance, and a standard deviation for each of the regions.

In S1030, the threshold setting unit 711, based on the statistics amounts calculated in S1020, calculates a detection threshold for each of the regions. For example, a value Z obtained by Expression (1) is calculated as a detection threshold, from a mean $\mu$ and a standard deviation $\sigma$ of difference values when a target (e.g., a visitor) does not exist in image data. Here, a coefficient a is a weight set according to a possibility that a moving object is detected. For example, in a case that the image quality enhancing for the inside of the ROI is desirably prevented when no target exists, a high value is set (e.g., 3 or larger), and when a possibility that a moving object is detected is desirably raised in consideration with a risk that the image quality enhancing is not performed as necessary, a low value (e.g., about 1) is set.

$$Z=\mu+a\sigma \quad \text{Expression (1)}$$

In S1040, the threshold setting unit 711 calculates a determination threshold. In the first embodiment, when the compressing and encoding unit 214 determines whether the moving object region is contained in the ROI or not, and the moving object region exists in one small area in the ROI, then the compressing and encoding unit 214 determines that the moving object region is contained in the ROI. In the present embodiment, a criterion of the determination is set according to an area inside the ROI. For example, the threshold setting unit 711 calculates an average value of an area of the moving object region, when the moving object region is set based on the detection threshold calculated in S1030, as a determination threshold (area threshold). Additionally, the threshold setting unit 711 sets (outputs) the calculated detection threshold and determination threshold to the storage unit 222.

With reference to FIG. 8 again, in S840, the moving object detection unit 213 performs the moving object detection process, based on the detection threshold set in S825. As the moving object detection technique, similarly to S540 in FIG. 5 described in the first embodiment, the inter-frame difference method or the background difference method is conceivable. For example, when the inter-frame difference method is used, the moving object detection unit 213 calculates a difference value between a pixel value of a frame being a target of the moving-object detection (e.g., a current frame) and a pixel value of a frame (e.g., a previous frame) captured at different timing from the target frame. Next, the moving object detection unit 213 detects a region with the difference value equal to or larger than the detection threshold as a moving object region. Additionally, for example, when the background difference method is used, the moving object detection unit 213 sets a frame captured when no moving object is assumed to exist as a background image. Then the moving object detection unit 213 calculates a difference value between a pixel value of the background image and a pixel value of a frame being a target of the moving-object detection (e.g., current frame). The moving object detection unit 213 detects a region with the difference value equal to or larger than the detection threshold as a moving object region. Additionally, the moving object detection unit 213 also calculates an area in an ROI of the detected moving object region.

In S850, the compressing and encoding unit 214, based on the determination threshold (area threshold) set in S825, determines whether the moving object region is contained in the ROI or not. Specifically, the compressing and encoding unit 214 compares the area calculated in S840 with the determination threshold, and when the calculated area is larger than the determination threshold, determines that at least part of the moving object region is contained in the ROI. When at least the part of the moving object region is contained in the ROI (S850: Yes), the processing advances to S860, and when the moving object region is not contained in the ROI (S850: No), the processing advances to S570. That is, even when the moving object detection unit 213 detects the moving object region in S840, in a case in which an area in the ROI of the moving object region does not exceed the determination threshold, the detected moving object region is determined not to be contained in the ROI.

In S860, the compressing and encoding unit 214 performs setting for the image quality enhancing for the inside of the ROI. At this time, the compressing and encoding unit 214, based on the area in the ROI of the moving object region calculated in S840, may perform setting to change a qP value to be set for the inside of the ROI, and duration for the image-quality enhancing process. For example, when the area of the moving object region calculated in S840 is larger than the predetermined threshold, the compressing and encoding unit 214 may set a smaller qP value for the inside of the ROI, and set longer duration for the image-quality enhancing process.

As described above, the image processing apparatus 100 in the second embodiment, based on distribution of the moving object regions of the scene when no target exists, controls the threshold value (sensitivity) for the moving-object detection, or the duration in which the image quality enhancing is performed for the inside of the ROI. This enables to efficiently enhance image quality of a necessary region at necessary timing, even when the moving object region exists in the ROI. Note that, in the above description, the example in which both the detection threshold and the determination threshold are used was described, but a configuration in which any one of the thresholds is used may be adopted.

Third Embodiment

In the first embodiment and the second embodiment, the moving-object detection is a trigger for the determination about the image quality enhancing, but in the present embodiment, usage of various other detection methods will be described. Specifically, in a network camera for monitoring, a target of the monitoring is often limited to people or vehicles, for example. Thus, when not an entire moving object but a face, a human body, a vehicle, or the like is detected inside a user-defined ROI, the image processing apparatus 100 may process such that the ROI is subjected to image quality enhancing. For example, the image processing apparatus 100 includes a target detection unit (not illustrated) for detecting a predetermined target (people, vehicle, or the like), and when the target detection unit detects the target and at least part of the target is contained in a user-defined ROI, the image processing apparatus 100 may process to enhance image quality of the ROI.

Further, the trigger for the image quality enhancing need not be limited to information from an image, and may be a sound. For example, the image processing apparatus 100 may include a sound detection unit (not illustrated) for detecting a predetermined sound, and when the sound detection unit detects the predetermined sound, the image processing apparatus 100 may process to enhance image quality of the ROI.

Additionally, the image processing apparatus 100, when a plurality of ROIs is set, may appropriately change a trigger for determining whether the image-quality enhancing process is to be performed or not for each of the set plurality of ROIs. For example, when a sound of breaking window glass is detected, the image processing apparatus 100 may enhance image quality of an ROI set for a window region by a user, on captured image data. Additionally, when a human angry voice is detected, on captured image data, an ROI set by the user on a road or a front of a door may be subjected to the image quality enhancing.

The present invention is not limited to each of the above-described embodiments, and various modifications are possible without departing from the gist of the present invention. For example, combinations of the respective embodiments are also included in the disclosure content of the present specification.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-015508, filed Jan. 31, 2018 which is hereby incorporated by reference herein in its entirety.

What is claimed is:

1. An image processing apparatus comprising:
a region setting unit configured to set a region of interest for a moving image captured by a capturing unit, based on an operation by a user;
a detection unit configured to detect a moving object region in an image frame of the moving image;
a determination unit configured to determine whether the detected moving object region is contained in the region of interest; and
an encoding unit configured to perform encoding processing such that image quality of the region of interest gets higher than previous image quality of the region of interest, in at least one of a first case and a second case, the first case being where at least part of the detected moving object region is determined to be contained in the region of interest by the determination unit, the second case being where the detected moving object region that is larger than a predetermined size is determined to be contained in the region of interest by the determination unit,
wherein even if the moving object region is no longer detected by the detection unit, the encoding unit continues performing the encoding processing, for the region of interest, for a predetermined duration.

2. The image processing apparatus according to claim 1, wherein in a case where the at least part of the detected moving object region is determined not to be contained in the region of interest by the determination unit, the encoding unit performs encoding processing for the region of interest using a quantization parameter that is the same as a quantization parameter for an outside of the region of interest.

3. The image processing apparatus according to claim 1, wherein the detection unit, in a case where a difference value of feature amounts is equal to or larger than a predetermined threshold in a partial region to which the image frame and a reference frame different from the image frame correspond, detects the partial region as the moving object region.

4. The image processing apparatus according to claim 1, further comprising:
a first threshold setting section for setting a different detection threshold for each of a plurality of regions in the image frame,
wherein the detection unit, in a partial region to which the image frame and a reference frame different from the image frame correspond, in a case where a difference value of feature amounts is equal to or larger than a detection threshold set for the partial region by the first threshold setting section, detects the partial region as the moving object region.

5. The image processing apparatus according to claim 4, wherein the first threshold setting section sets the different detection threshold based on an operation by a user.

6. The image processing apparatus according to claim 4, wherein the first threshold setting section analyzes a moving object detected in one or more reference frames different from the image frame, to set the different detection threshold.

7. The image processing apparatus according to claim 3, wherein the feature amount is based on a pixel value.

8. The image processing apparatus according to claim 1, further comprising:
a second threshold setting section for setting an area threshold for the region of interest,
wherein the determination unit, in a case where an area of the detected moving object region included in the region of interest exceeds the area threshold, determines that the detected moving object region is contained in the region of interest.

9. The image processing apparatus according to claim 8, wherein the second threshold setting section sets the area threshold based on an operation by a user.

10. The image processing apparatus according to claim 8, wherein the second threshold setting section analyzes a moving object detected in one or more reference frames different from the image frame, to set the area threshold.

11. The image processing apparatus according to claim 1, further comprising:
a target detection unit for detecting a predetermined target in the image frame,
wherein the encoding unit, in a case where the detected target is determined to be contained in the region of interest by the determination unit, performs the encoding processing for the region of interest.

12. The image processing apparatus according to claim 1, further comprising:
a sound detection unit for detecting a predetermined sound in the image frame,
wherein the encoding unit, in a case where a predetermined sound is detected by the sound detection unit, performs the encoding processing for the region of interest.

13. The image processing apparatus according to claim 1, wherein the encoding unit is configured to perform the encoding processing such that image quality of the region of interest gets higher than image quality of outside of the region of interest.

14. A control method for an image processing apparatus, the method comprising:
setting a region of interest for a moving image captured by a capturing unit, based on an operation by a user;
detecting a moving object region in an image frame of the moving image;
determining whether the detected moving object region is contained in the region of interest; and
performing encoding processing such that image quality of the region of interest gets higher than previous image quality of the region of interest, in at least one of a first case and a second case, the first case being where at least part of the detected moving object region is determined to be contained in the region of interest by the determining, the second case being where the detected moving object region that is larger than a predetermined size is determined to be contained in the region of interest by the determining, wherein even if the moving object region is no longer detected by the detecting, the performing encoding processing continues performing the encoding processing, for the region of interest, for a predetermined duration.

15. A non-transitory computer-readable storage medium making a computer function as a plurality of units comprising:
- a region setting unit for setting a region of interest for a moving image captured by a capturing unit, based on an operation by a user;
- a detection unit for detecting a moving object region in an image frame of the moving image;
- a determination unit for determining whether the detected moving object region is contained in the region of interest; and
- an encoding unit for performing encoding processing such that image quality of the region of interest gets higher than previous image quality of the region of interest, in at least one of a first case and a second case, the first case being where at least part of the detected moving object region is determined to be contained in the region of interest by the determination unit, the second case being where the detected moving object region that is larger than a predetermined size is determined to be contained in the region of interest by the determination unit, wherein even if the moving object region is no longer detected by the detection unit, the encoding unit continues performing the encoding processing, for the region of interest, for a predetermined duration.

* * * * *